(12) United States Patent
Larsen et al.

(10) Patent No.: US 7,590,068 B2
(45) Date of Patent: Sep. 15, 2009

(54) PROBING METHOD FOR A MULTI-STATION NETWORK

(75) Inventors: James David Larsen, Woodinville, WA (US); Paul Jonathan Rodman, Kirkland, WA (US)

(73) Assignee: IWICS Inc., Bothell, WA (US)

(*) Notice: Subject to any disclaimer, the term of this patent is extended or adjusted under 35 U.S.C. 154(b) by 703 days.

(21) Appl. No.: 10/876,166

(22) Filed: Jun. 24, 2004

(65) Prior Publication Data

US 2005/0135270 A1    Jun. 23, 2005

Related U.S. Application Data

(60) Provisional application No. 60/531,308, filed on Dec. 19, 2003.

(51) Int. Cl.
| | |
|---|---|
| H04L 12/26 | (2006.01) |
| H04L 12/56 | (2006.01) |
| G06F 15/177 | (2006.01) |
| G06F 15/16 | (2006.01) |
| G06F 15/173 | (2006.01) |

(52) U.S. Cl. ............... 370/238; 370/252; 370/400; 709/221; 709/232; 709/242; 709/249

(58) Field of Classification Search ........... 370/238, 370/252, 400, 235, 437; 709/221, 238, 249, 709/232, 242
See application file for complete search history.

(56) References Cited

U.S. PATENT DOCUMENTS

| | | | | |
|---|---|---|---|---|
| 6,097,703 A | * | 8/2000 | Larsen et al. | 370/254 |
| 6,456,594 B1 | * | 9/2002 | Kaplan et al. | 370/238 |
| 6,735,448 B1 | * | 5/2004 | Krishnamurthy et al. | 455/522 |
| 6,798,765 B2 | * | 9/2004 | Larsson | 370/351 |
| 6,810,428 B1 | * | 10/2004 | Larsen et al. | 709/238 |
| 6,898,437 B1 | * | 5/2005 | Larsen et al. | 455/522 |
| 6,965,568 B1 | * | 11/2005 | Larsen | 370/238 |
| 2004/0165532 A1 | * | 8/2004 | Poor et al. | 370/238 |
| 2005/0135242 A1 | * | 6/2005 | Larsen et al. | 370/229 |
| 2008/0261605 A1 | * | 10/2008 | Larsen | 455/446 |

FOREIGN PATENT DOCUMENTS

| | | | |
|---|---|---|---|
| GB | WO98/56140 | * | 12/1998 |
| GB | WO 99/07105 | * | 2/1999 |

OTHER PUBLICATIONS

Ambuhl, Christoph, "Efficient Algorithms for Low-Energy Bounded-Hop Broadcast in Ad-Hoc Wireless Networks," Mar. 13, 2004, Springer Berlin, vol. 2996/2004, p. 418-427.*

* cited by examiner

Primary Examiner—Dang T Ton
Assistant Examiner—Ryan C Kavleski
(74) Attorney, Agent, or Firm—Ladas & Parry LLP

(57) ABSTRACT

The invention relates to a method of operating a communication network, the network comprising a plurality of stations which are able to transmit data to and receive data from one another. The method comprises defining a first probing channel for the transmission of probe signals to other stations. Other stations which receive the first probe signals from a probing station indicate to the probing station their availability as destination or intermediate stations. A neighbor table comprising details of these other available stations is maintained at each station. Also, second probe signals are sent and received from stations in the neighbor table and a gradient table comprising data related to the cost of communicating with each neighbor station is maintained at each station, thereby to allow each station to select a predetermined number of intermediate stations for onward transmission of data from an originating station to a destination station at minimum cost.

8 Claims, 8 Drawing Sheets

ODMA System Level Architecture

PROBING METHOD FOR A MULTI-STATION NETWORK

BACKGROUND OF THE INVENTION

THIS invention relates to a method of operating a multi-station communication network of the general kind described in International Patent applications nos. WO 96/19887 and WO 98/56140. The invention also relates to such a network itself.

Networks of the kind referred to above can be utilised commercially, with users being subscribers who are billed for their use of the network. Alternatively, networks of this kind may be utilised by security forces such as police or military forces.

A further application for networks of the kind referred to is in Wireless Local Area Networks (WLANs), where a wireless network can be combined with conventional network structures to service fixed and mobile network users. Such networks are usually but not necessarily computer networks.

SUMMARY OF THE INVENTION

According to the invention there is provided a method of operating a communication network comprising a plurality of stations each able to transmit and receive data so that the network can transmit data from an originating station to a destination station via at least one opportunistically selected intermediate station, the method comprising:
  a) defining at least one probing channel, distinct from at least one data channel;
  b) selecting, at each station and according to first predetermined criteria, a probing channel for the transmission of probe signals to other stations;
  c) transmitting first probe signals from each station on the selected probing channel, other stations which receive the first probe signals from a probing station responding directly or indirectly to thereby indicate to the probing station their availability as destination or intermediate stations;
  d) maintaining, at each station, a neighbor table comprising details of other available stations identified by step (c);
  e) transmitting, from a station needing to send data to a destination station that is not a neighbor station, second probe signals to, and receiving second probe signals from, stations in the neighbor table; and
  f) maintaining as needed, at each station, a gradient table comprising data related to the cost of communicating with each neighbor station, thereby to allow each station to select a predetermined number of intermediate stations for onward transmission of data from an originating station to a destination station at minimum cost.

The details of other available stations identified by step (c) may include the path loss and power required to reach the other available stations.

Preferably, the second probe signals are transmitted from each station only while the neighbor table of said station contains entries.

The method may include calculating, for each station in the neighbor table, a cost to destination value for the cost of transmitting a message from an originating station to a destination station via each such station in the neighbor table.

Preferably, each station also maintains a temporary record of its own cost to destination value.

The cost to destination value is preferably the cumulative cost, via each such station in the neighbor table and any intermediate stations, of transmitting a message from the originating station to the destination station.

Preferably, the method includes the step of maintaining a calculated cost to destination value for each station constant for a period during which other stations can update their own cost to destination values, to prevent stations using obsolete cost to destination values of other stations in their own calculations.

According to another aspect of the invention there is provided a communication network comprising a plurality of client stations each able to transmit and receive data so that the network can transmit a message comprising a plurality of data packets from an originating client station to a destination client station via at least one opportunistically selected intermediate client station, and wherein the network further comprises
  a plurality of gateways arranged to serve as access points to the network for client stations;
  a plurality of seed stations with which client stations can communicate, each seed station being in communication with at least one gateway, the plurality of seed stations extending the effective connectivity range of the client stations;
  and at least one subscriber network manager for monitoring the client stations;
wherein each client station is adapted to:
  a) define at least one probing channel, distinct from at least one data channel;
  b) select, at each client station and according to first predetermined criteria, a probing channel for the transmission of probe signals to other client stations;
  c) transmit first probe signals from each client station on the selected probing channel, other client stations which receive the first probe signals from a probing client station responding directly or indirectly to thereby indicate to the probing client station their availability as destination or intermediate client stations;
  d) maintain, at each client station, a neighbor table comprising details of other available client stations identified by step (c);
  e) transmit, from a client station needing to send data to a destination client station that is not a neighbor client station, second probe signals to, and receiving second probe signals from, client stations in the neighbor table; and
  f) maintain, at each client station, a gradient table comprising data related to the cost of communicating with each neighbor client station,
  thereby to allow each client station to select a predetermined number of intermediate client stations for onward transmission of data from an originating client station to a destination client station at minimum cost.

DESCRIPTION OF AN EMBODIMENT

The present invention relates to a method of operating a multi-station communication network of the kind described in International patent applications nos. WO 96/19887 and WO 98/56140, the contents of which are incorporated herein by reference. In brief, the basic operation of such a network is as follows.

The multi-station network comprises a number of independent stations, which may be fixed or mobile, each of which can transmit and receive data in order to transmit messages from originating stations to destination stations opportunistically via intermediate stations. In order for an originating station to be in a position to send a new message to a destination station via a selected one of several possible intermediate stations, each station must at any time normally be in contact with several other stations. This applies also to the case where stations are required to relay a message from an originating station to a destination station.

In order to do this, each station selects one of a number of possible probing channels to transmit probe signals to other stations. The probe signals contain data identifying the station in question and include details of its connectivity to other stations. Other stations receiving the probe signals respond directly to the probing station or indirectly, via intermediate stations, thereby indicating both to the probing station and other stations their availability as destination or intermediate stations. The probing station evaluates the direct or indirect responses to identify other stations with which it can communicate optimally.

In particular, the stations of the network may monitor the cumulative power required to reach another station thereby defining a power gradient to the other stations, with stations selecting a route through the network between an originating station and a destination station which optimizes the power gradient. This enables data throughput through the network to be maximized, with minimum interference and contention between stations.

Each station in the network comprises a transceiver able to receive and transmit data from any other station within range. The network could be a packet radio network, as described in the above mentioned International patent applications, but it will be appreciated that the invention is applicable to other networks in which user stations can communicate with one another via intermediate stations in the network.

The above described method of opportunistic data transmission between stations of a network is referred to herein as Opportunity Driven Multiple Access (ODMA).

An embodiment of the present invention will now be described with reference to a WLAN system based on the 802.11b standard. An example of such a WLAN arrangement is illustrated in the schematic diagram of FIG. 1.

Figure 1:
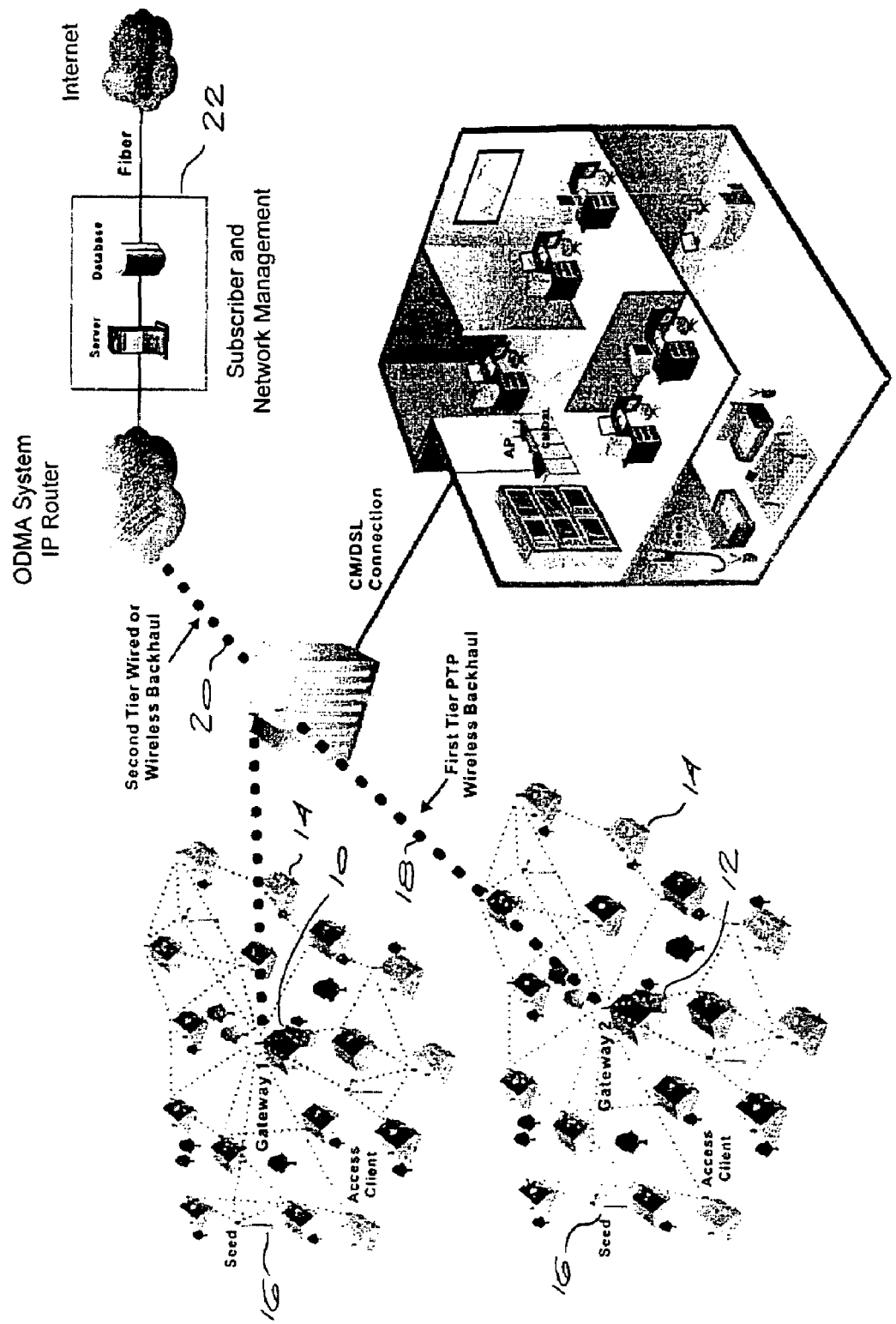
FIG. 1 is an overall system diagram showing a WLAN network utilising the method and system of the present invention.

In FIG. 1, first and second gateways 10 and 12 each serve as an access point to the network for a number of subscriber units (client devices) 14, who are typically network users. The client devices in this embodiment will typically be wireless network cards which can communicate with the respective gateways 10 and 12 either directly, or indirectly via other client devices, using ODMA techniques. In addition, a number of seed stations 16, which are wireless routers, are deployed strategically near the gateways 10 and 12. The seed stations effectively extend the coverage range and throughput of the network by extending the connectivity range of the client devices, particularly in difficult environments.

ODMA protocols can operate over wireless links to opportunistically relay data between subscriber units (client devices) and seeds, over wired networks such as local area networks, and the wireless backhaul or fibre links 18 and 20 shown in FIG. 1. The relaying from station to station may involve wire and wireless hops and hops via wireless backhaul as shown.

The network opportunistically routes messages wirelessly from subscriber to subscriber and via seeds into gateways and then via point to point links into fibre, into another region.

In this way a national and international network using ODMA, via the various types of network, can allow messages to be passed from any user to any other user in any part of the world. The network will automatically find optimal paths for the message packets to follow and provide load balancing and healing of broken links by finding alternate paths through the network. All units in the ODMA network have unique addresses called SID (System ID).

A subscriber network manager 22 monitors the health of the various stations in the network and manages the security and billing of the network.

In the above described example, the client devices can communicate with the gateways 10 and 12, either directly, via the seed stations 16, or via one or more intermediate client devices, in the manner described in the abovementioned International patent applications. In addition, the client devices can form instant, peer-to-peer networks with other similar devices.

The use of opportunistic multi-hop routing in a network of this kind improves network robustness, as client devices can hop to alternate gateways if their current gateway fails, and tends to eliminate bottlenecks and improve overall network performance. In conventional 802.11b systems, the range tends to be reduced drastically, typically to less than a hundred meters. In order to increase coverage to distant client devices the data rate must be reduced. In turn, the use of a low data rate causes client devices to stay on the data channel for longer, so that throughput suffers for all client devices of the WLAN. The use of opportunistic multi-hop routing solves this problem, since even distant client devices can, using multiple hops at the highest data rate through seed stations and neighboring client devices, transmit data to a destination, avoiding network congestion. The optimal use of channels and power adaption reduces contention and optimizes the throughput offered to the users.

Figure 2:
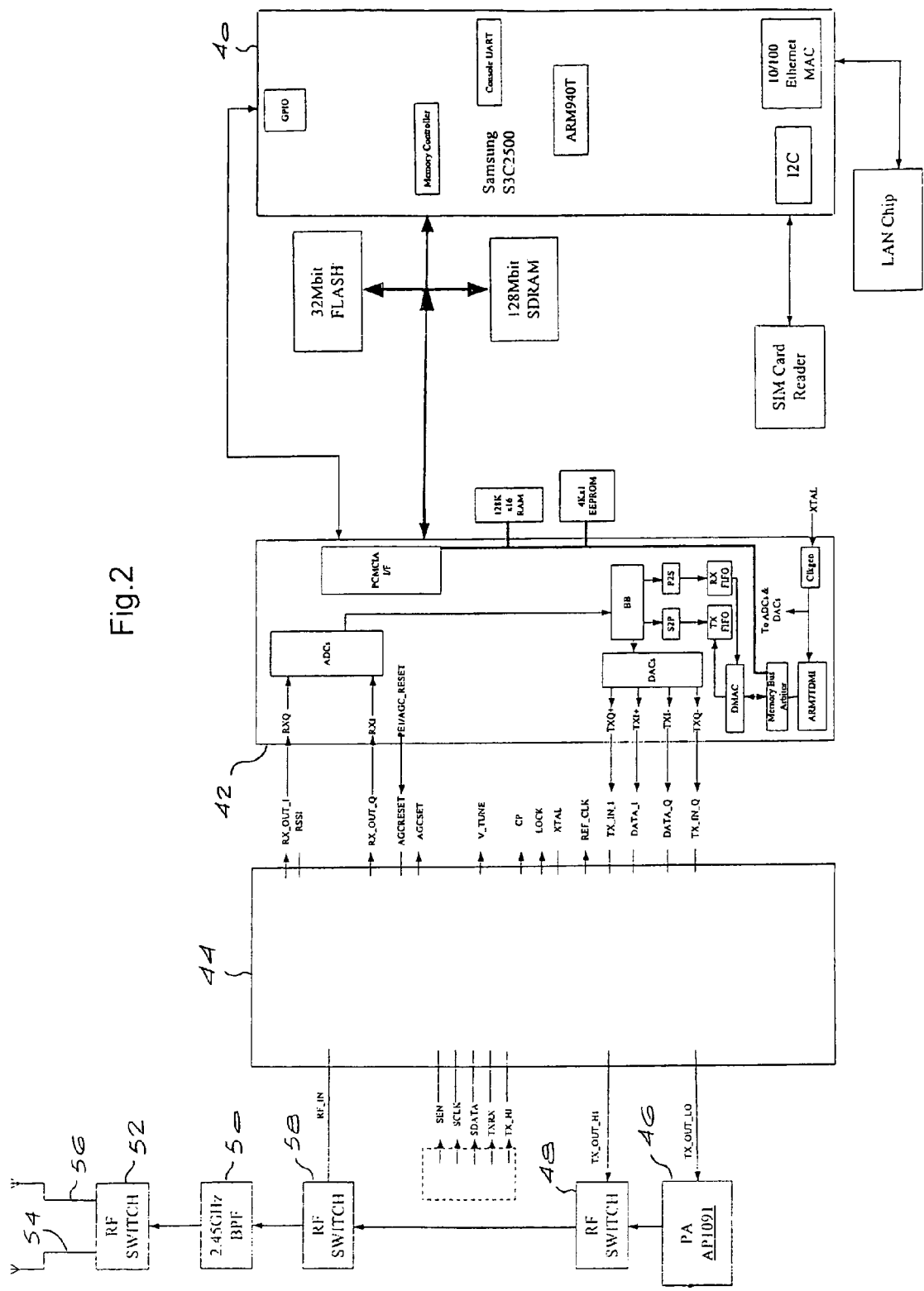
FIG. 2 is a schematic block diagram of a client device used in the network of FIG. 1.

FIG. 2 shows a schematic block diagram of a client device forming part of an 802.11b WLAN. The client device includes a Samsung S3C2500 microcontroller 40 with ARM940T RISC embedded. It also provides 10/100 Mbps Ethernet Controllers, a Memory Controller, I2C and GPIOs to communicate with a LAN chip, a SIM card reader and a ZD1201 Base-Band Processor. The S3C2500 chip is equipped with 32 Mbit Flash and 128 Mbit SDRAM memory.

The device includes a highly-integrated ZD1201 WLAN combination chip 42 which uses high speed DSP hardware logic to perform 802.11 and 802.11b baseband modulation and demodulation. To follow up the future MAC standards defined by IEEE 802.11 group, an ARM7 RISC processor is embedded in the ZD1201 chip. This permits use of the latest WLAN features by simply upgrading the software drivers.

The client device includes a SA2400 fully integrated single IC RF transceiver 44 designed for 2.45 GHz wireless LAN (WLAN) applications. It is a direct conversion radio architecture that is fabricated on an advanced 30 GHz fT BiCMOS process. The SA2400A combines a receiver, transmitter and LO generation into a single IC. The receiver consists of a low-noise amplifier, down-conversion mixers, fully integrated channel filters, and an Automatic Gain Control (AGC) with an on-chip closed loop. The transmitter contains power ramping, filters, up-conversion, and pre-drivers. The LO generation is formed by an entirely on-chip VCO and a fractional-N synthesizer. Typical system performance parameters for the receiver are 93 dB gain, 7.5 dB noise figure, input-referred third-order intercept point (IIP3) of +1 dBm, AGC settling time of 8 ms, and TX-to-Rx switching time of 3 ms. The transmitter typical system performance parameters are an output power range from −7 dBm to +8dBm in 1 dB steps, −40 dBc carrier leakage after calibration, 22 dB sideband suppression, in-band common mode rejection of 30 dB, and Rx-to-Tx switching time of 3 ms.

The device comprises a power amplifier stage in the form of an AP1091 linear, two stage power amplifier 46 with high output power in the 2.4 GHz band. The device delivers 26 dBm of linear output power compliant with the IEEE802.11b standard. The power amplifier also includes an on-chip power detector, providing a DC voltage proportional to the output power of the device.

The device further includes a DC-3 GHz SPDTRF switch 48, which has low insertion loss and positive voltage operation with very low DC power consumption.

A first RF switch 52 close to the antennas 54 and 56 provides the ability to choose which antenna is used for transmission or reception. From the selected antenna, the received input is applied to a 2.45 GHz bandpass filter 50. This filter rejects interferers outside the 2.4 GHz ISM band. A second RF switch 58 close to the 2.45 GHz bandpass filter provides TX/RX switching. This switch in receive mode leads the signal into the LNA section of the SA2400. Next, the signal is mixed down to baseband with the quadrature down-converter into the I and Q components. Finally, the signal goes to the ADC's of the ZD1201. The baseband circuit samples the waveform and then despreads and demodulates the received data.

On the transmit link, data can be DBPSK, DQPSK or CCK modulated, resulting in a baseband quadrature signal with I and Q components. The signals then go to the input of the upconverting mixer for conversion to the 2.4 GHz-2.5 GHz band. The SA2400 is operated in either high-power mode or low-power mode to cover a high output power range. When operated in high-power mode, the TX_OUT_LO is selected and goes to the AP1091 amplifier to provide high output power. When operated in low-power mode, the TX_OUT_HI is selected and the signal goes through the RF switch directly. Note that a TX AGC function is provided by the ZD1201 Base-Band Processor 42.

Figure 3:
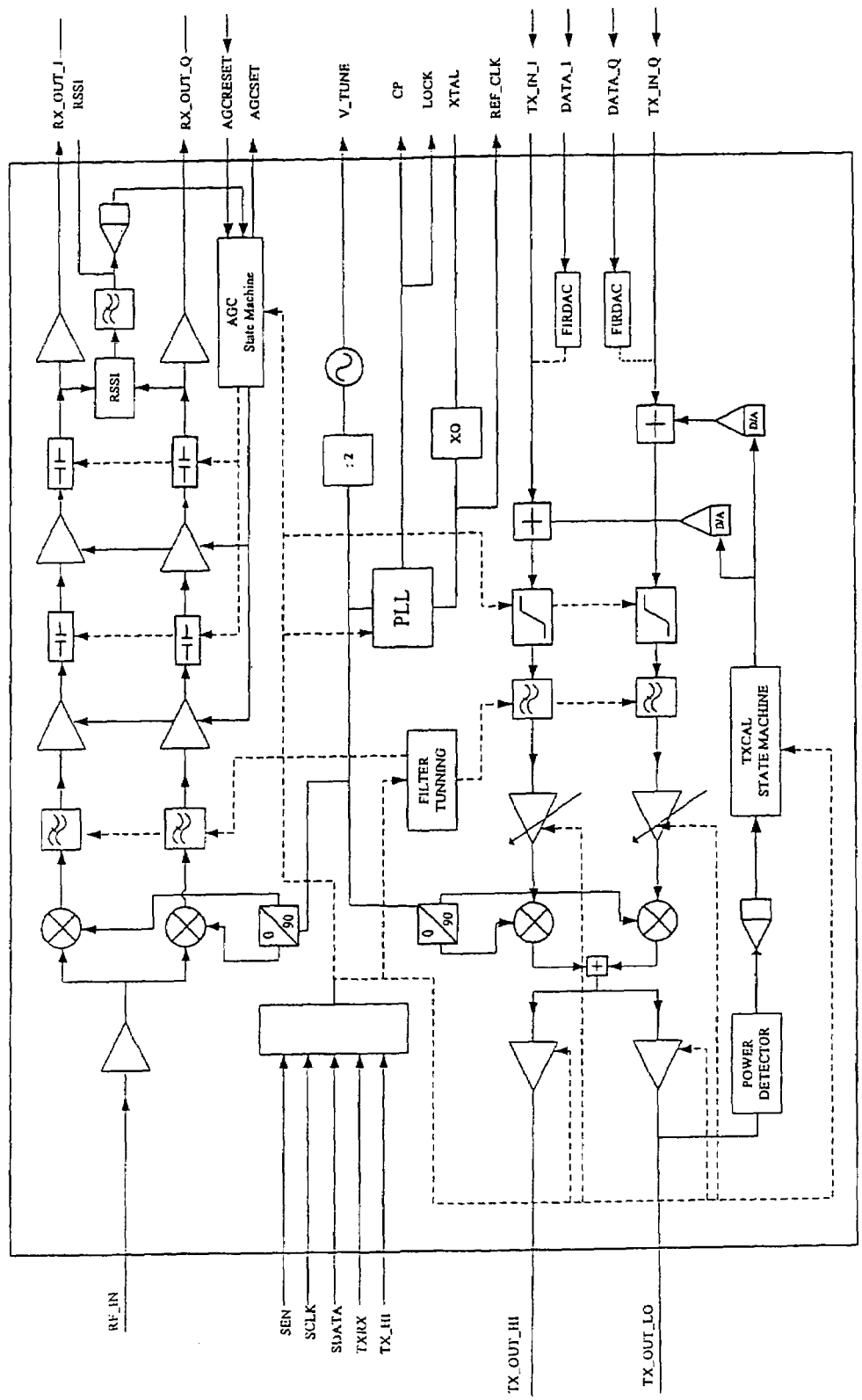
FIG. 3 is a detailed schematic diagram of a single chip transceiver used in the device of FIG. 2.

The internal circuit of the SA 2400 transceiver is shown in the more detailed schematic diagram of FIG. 3.

Figure 4:
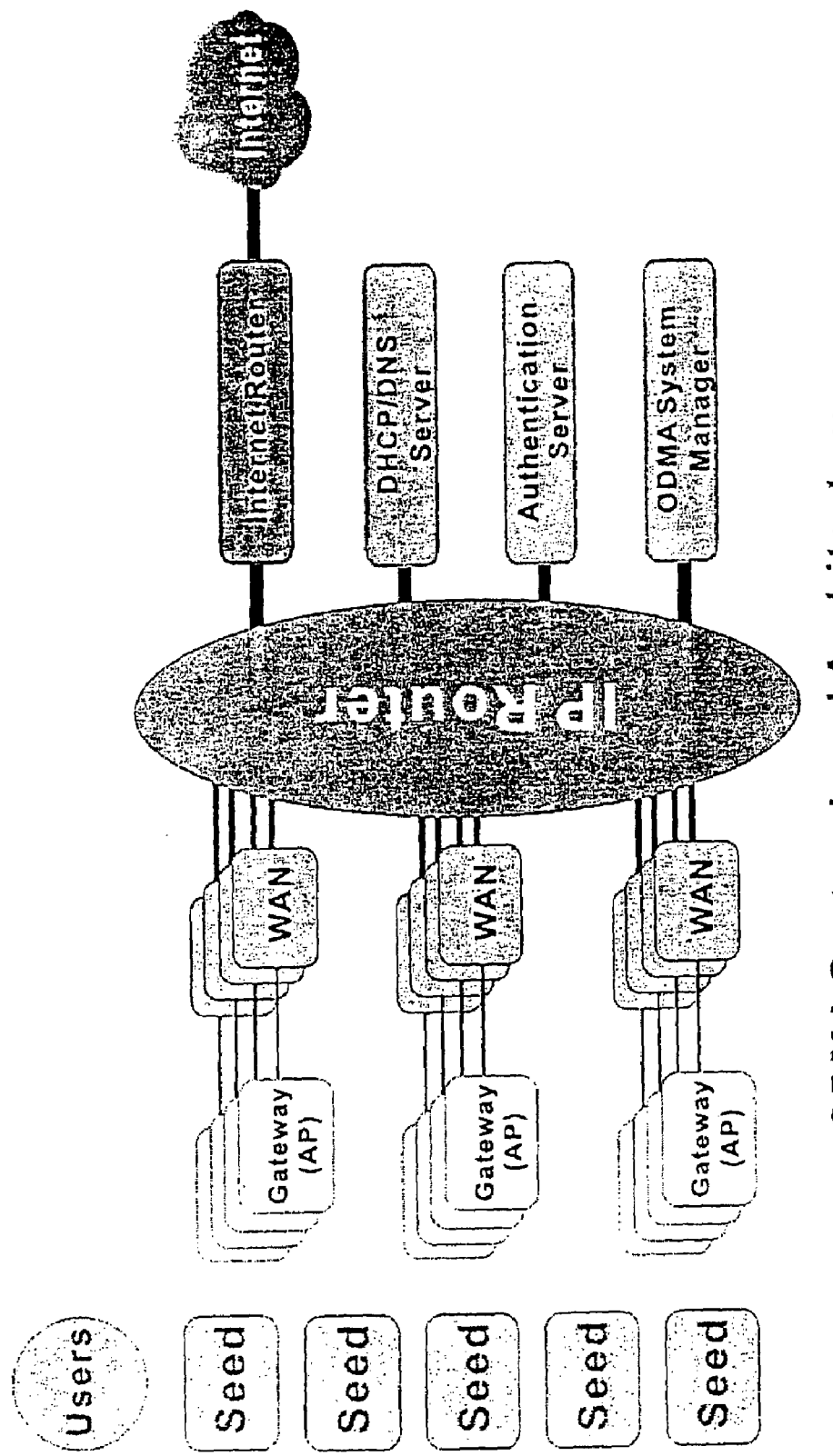
FIG. 4 is a schematic diagram of the system level architecture of the network of FIG. 1.

FIG. 4 shows the system level architecture of the network of FIG. 1. The system essentially comprises subscriber units or users (client devices), seed stations, and gateways that link the client devices to a WAN. The client devices can communicate with each other by relaying messages directly between themselves or via the seed stations. If a user wants to access other networks such as the Internet the messages are relayed to the WAN via a gateway and then a router network into the other networks. The gateways act as translators from the ODMA protocols used by the client devices and seed stations to other protocols such as TCP/IP.

The operation of the above described network will now be described with reference to the schematic diagrams of FIGS. 5 to 11.

Figure 5:
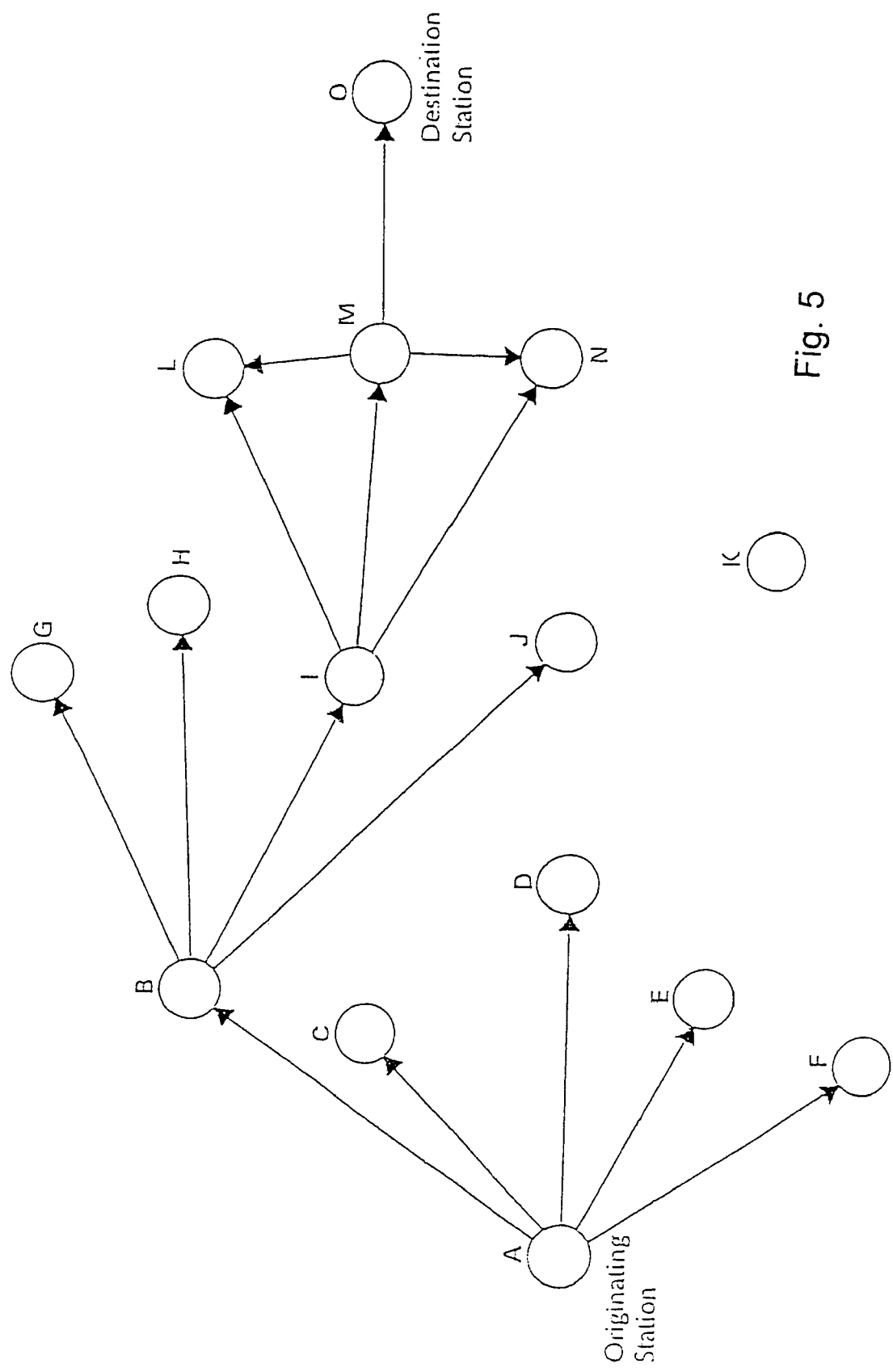
FIG. 5 is a schematic diagram of a network of the invention, in which stations communicate with one another via intermediate stations.

In FIG. 5, an originating station A is able to communicate with five "nearby" stations B to F, and is transmitting data to a destination station O via intermediate stations B, I and M. The stations A to M and O will generally be user stations comprising client devices as described above, but some may be seed stations, for example.

In order to maximize the efficiency of the network, it is desirable that each station should have a number of "neighbor" stations with which it can communicate, in case that station needs to send or receive a message. On the other hand, if a given station is transmitting data to a selected neighbor station, it is desirable that the transmission should cause the minimum of interference to other stations, otherwise the resulting contention between stations will reduce the amount of data throughput in the network.

With the above in mind, the present network seeks to adjust the operation of each station so that it can at any time send data to or receive data from a number of neighbor stations, at the highest possible data rate but at the lowest possible transmitted power, thus reducing interference with other stations.

A communication network of the kind in question comprises many stations trying to communicate on the same set of channels. The channels can be defined as having different frequencies, different media, different coding (eg. different spreading codes), different antennas, different time slots etc., or any combination of these. In order to optimise channel re-use, the stations try to maintain a limited number of immediate neighbors, typically 5 neighbors. A neighbor is defined as another station that a given station can communicate with.

A station can limit the number of neighbors it sees or that see it by changing its transmission frequency, changing code (PN Sequence), increasing its data rate, and dropping its transmit power. All stations will gather at predefined Probing Channels where they will find other stations to communicate with, using probe signals. Once another station is found and either of the stations have data to send to the other they may then move to a less used Data Channel.

The method of the present invention comprises two kinds of probing processes, "slow probing" and "fast probing". The slow probing process is used by each network station to gather neighbors, while the fast probing process is used to construct gradients between originating and destination stations.

Dealing first with the slow probing process, when there are a number of stations in close proximity they will end up probing at higher data rates and low transmit powers. Stations will occasionally respond to stations that are on probing at the lower data rates or that do not have enough neighbors to help any lonely (distant) stations (also referred to below as lonely neighbors) that cannot use the higher data rates or do not have sufficient neighbors. Stations will only use the lower data rates when they are lonely and cannot find sufficient neighbors at the higher data rates and at maximum power.

Each station will transmit slow probe signals at regular intervals (determined by a Slow Probe Timer) trying to find other stations. Stations indicate in their slow probes that they are able to detect other stations probing and in that way stations will vary their probe power until a certain predetermined number of stations indicate they are able to detect the probes. If a station never acquires the required number of neighbors it will remain at the lowest data rate and maximum transmit power.

Each station will randomly vary the Slow Probe Timer slightly between slow probe signal transmissions to avoid collision with other stations. Should any station start receiving another station's transmission, it will reload the Slow Probe Timer with a new interval.

In a network of mobile stations the stations are constantly moving, and as such the number of neighbors will constantly be changing. If the number of neighbors exceeds the required number a station will start to increase its data rate on the probing channel. It will continue to increase its data rate until it no longer exceeds the required number of neighbors. If it reaches the maximum data rate it will start to drop its slow probe transmit power by 10 dB increments until it either reaches the minimum transmit power, or no longer exceeds the required number of neighbors.

When a station replies to another station's slow probe on a Probing Channel it will limit the length of its data packet to the Slow Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Probing Channel. The station that is requesting the change will randomly select one of the available Data Channels. (When the other station receives the request it will immediately change to that Data Channel, where the two stations will continue to communicate until neither of them have any data to send, or if the maximum time for remaining on the Data Channel expires (set by a Data Timer). Alternative data transport protocols could also be used.

When a station changes to the Data Channel it loads the Data Timer. It will remain on the Data Channel for as long as the Data Timer will allow. When the Data Timer expires the stations will revert back to the Probing Channel and start probing again.

Figure 6:
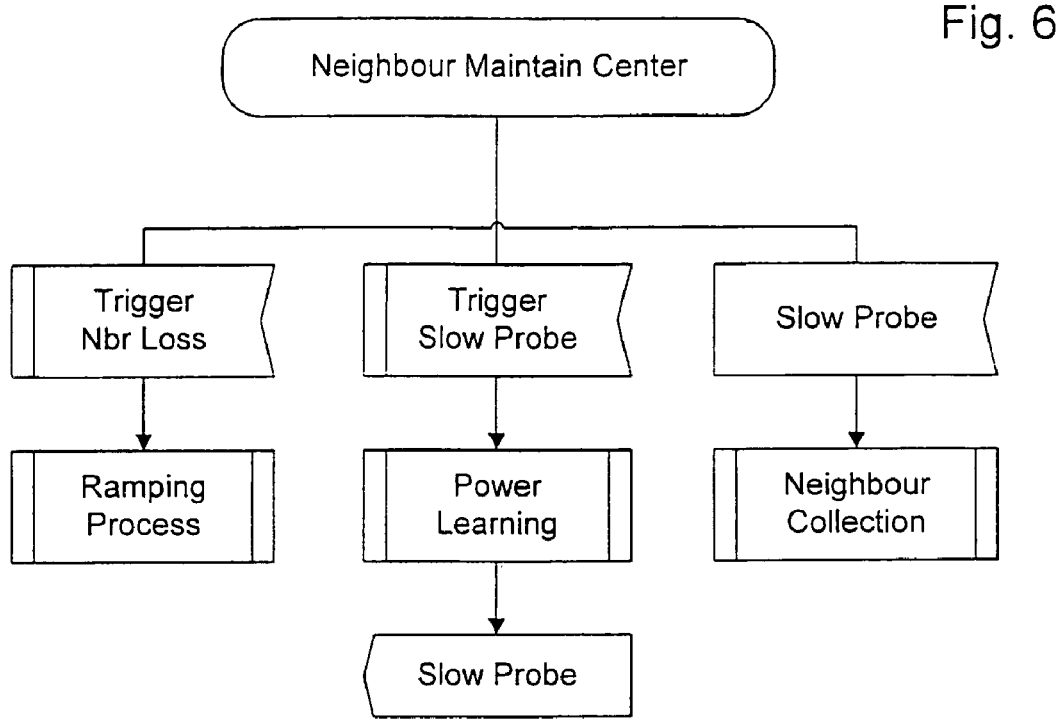
FIG. 6 is a schematic diagram of a slow probing mechanism of the invention.

The schematic diagram of FIG. 6 illustrates the slow probing process of the invention.

The slow probing process consists of three basic functions:
1. Neighbor collection
2. Power learning
3. Ramping of neighbors The process of neighbor collection consists of a station probing at increased levels of power until neighboring stations indicate in their own probes that they are detecting the probes of the first station. This is called neighbor collection. The power of the probe is increased until a predetermined number of neighbors indicate that they are detecting the probes.

All probing stations increase and decrease their probe power until all stations have collected a predetermined number of neighbors. This process consists of increasing and decreasing the power level of probes and indicating in probes which other stations' probes are heard. In this way all stations can learn what power level they require to reach various neighbors.

Each time a station probes it indicates its transmit power and noise floor and which stations it has as neighbors. Every time a station hears another station probe it calculates from the probe the path loss and power required to reach the station from the path loss and the noise floor of that station. The path loss to the neighbor and the power required to reach the neighbor is stored in a table kept at each station called a neighbor table. If a neighbor is no longer heard then the path loss and power level required to reach the station is increased or "ramped" in the table until a certain level is reached at which point the neighbor is removed from the neighbor table.

The slow probing process of the invention is described in more detail in the following example:

Slow Probing Parameters
   Min Probing Power (PPmin)
   Max Probing Power (PPmax)
   Probing Power step (PPstep)
   Probing Interval (Pint)
   Probing Interval std dev. (Psdev)
   Probing Intervals per power step (nPPs)
   Neighbor Timeout interval (TNint)
   Close Neighbor Timeout interval (TCNint) (TCNint<TNint)
   # of close neighbors to gather (nNbrs)
   Max # of neighbors to include in a probe (nPNbrs)
   Station noise floor (Nfloor)
   Loss ramping time (tinc)
   Loss ramp increment (Linc) (dB)
   Loss ramp excess (Lex) (dB)

Types Of Message
   Probe
   Probe Ack

Definitions
   Neighbor: a station that has transmitted a Probe or Probe Ack that can be seen at this station.
   Close Neighbor: a Neighbor that has transmitted a Probe that contains this station's ID.

Protocol (for Each Station):

At regular intervals (Pint±Psdev) each station sends out a Probe. Initially transmit at power PPmin. At each nPPs intervals increase power by PPstep until at least nNbrs Close Neighbors have been found (they have responded with this station's ID in their Probe messages) or the power reaches PPmax (at which stage continue Probe transmissions at this power level). If more than nNbrs Close Neighbors can be seen, start ramping the power back down.

A Probe consists of the following information:
a. The noise floor at this station (Nfloor).
b. The transmit power of this probe message.
c. The total number of Neighbors of this station (not used at present).
d. The total number of Close Neighbors of this station.
e. The station IDs of the nearest nPNbrs (or fewer) Neighbors (or possibly all Neighbors—an option).

(The nearness of a Neighbor is based on the received power of that Neighbor's last Probe message)

When not probing, the station is listening for Probes (or Probe Acks) from other stations. When another station's Probe is heard, the transmit power info in the Probe message is used to determine the path loss to that station. The noise floor information is then used to determine the minimum transmit power needed to send a message to that station and the Neighbor table updated suitably.

If a station is heard that:
(a) is transmitting its Probe at PPmax power,
(b) claims to have fewer than nNbrs Close Neighbors,
(c) is not one of the Close Neighbors of this station and
(d) that this station can communicate with, then the remote station is considered a "Lonely Neighbor". In this case immediately (±Psdev) send a Probe Ack message at a suitable power that it can be heard by the remote station.

The Probe Ack contains the following information:
a. The noise floor at this station
b. The Tx power of this Probe Ack message
c. The station ID of the "Lonely Neighbor"

If this station hears a Probe Ack message containing this station's ID, then the transmitting station is tagged as a Close Neighbor.

If a neighbor table entry is not updated (by probes from that neighbor) after time tinc, add Linc to the reported loss in the entry. Repeat this at intervals of tinc until either the entry is updated by a probe, or until the transmit power required to reach the neighbor using the reported loss exceeds the maximum permitted power by Lex dB. In the latter case set the loss to infinity. Note that changes here may well cause existing gradients to freeze (see below).

A problem which can occur in the above described method, and in other methods of vector routing, where all stations on the route between the originating and destination stations are not known, is that the route to the destination station could include the originating station, effectively creating a loop in the power gradient.

If the loss is at infinity and no entries exist in the gradient table involving the neighbor, then the neighbor table entry should be deleted.

If a Probe/Probe Ack is not heard from a Neighbor for TNint then drop the Neighbor. If a Probe/Probe Ack is not heard from a Close Neighbor for TCNint then revert the Close Neighbor back to Neighbor status.

The cost to a particular neighbor can be calculated in terms of the transmit power to reach the neighbor.

For example less than −10 dBm=cost 1
Less than 0 dBm=Cost 2
Less than 10 dBm=Cost 3
Less than 17 dBm=Cost 4

The cost is an indication of the power required to reach a neighbor. The more power required the more interference, and the higher the cost in terms of power (battery) consumption etc.

If all the costs for multiple hops are added together then the total cost is an indication of how much power would be used, or interference generated, if a message followed those hops.

The slow probe develops an indication of the power required to reach neighbors.

If a station has a message for a destination that is not one of its neighbors, for example, a distant station across the network, it begins to transmit fast probe signals to develop information on how to reach the destination. The information is called a gradient and is an indication of the cumulative cost to reach a destination. When a station starts to fast probe it indicates that it is looking for a destination and neighbors hearing the fast probe will fast probe themselves until the destination hears the fast probes of its neighbors. The gradient is then built through adding cumulative cost until the gradient reaches the source, and the source can commence to send messages to neighbors that have lower gradients to destination, which in turn can send them to their neighbors until the destination is reached.

Each station keeps a record of the (cumulative cost) gradients to each destination of each of its neighbors, and its own gradient to the destination. Each station only passes messages to stations with a lower cumulative cost to destination. A station can pass a message to any of its neighbors with a lower gradient to destination. Neighbor gathering via slow probing and gradient generation via fast probing allow a station to develop a number of choices of stations with lower cost to any destination that can send messages to such destinations. The neighbors are maintained all the time via slow probing and gradients are only developed on a needs basis when messages need to be sent to stations that are not neighbors.

Figure 7:
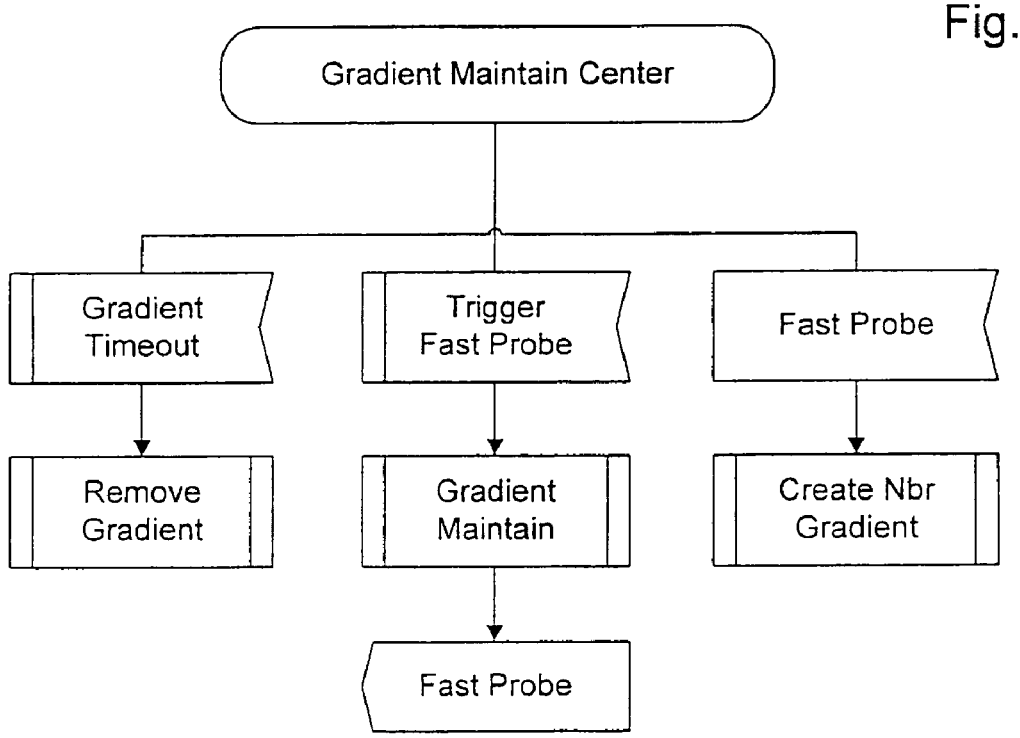
FIG. 7 is a similar schematic diagram of a fast probing mechanism.

The fast probing process or algorithm illustrated schematically in FIG. 7 is used to construct gradients along paths between originating and destination stations. The gradients are preferably expressed in terms of cost to neighbor ($C_N$). The process starts when either A message is originated at the station or A fast probe from a neighbor is intercepted A station remains in fast probing mode until all gradients it is maintaining are either cancelled by source or destination stations, or the gradients time out.

Fast Probing Parameters
    Fast probing rate (FPRate) in msec.
    Maximum hops for a fast probe (maxHops).
    Gradient timeout (Gtimeout) in msec.
    Maximum acceptable cost (maxCost).
    Frozen entry timeout (Ftime) in msec
    Station data structures
    Note that the data structures below may have other information in them, not directly pertaining to the fast probing algorithm.

Neighbor Table
    An entry for each neighbor.

Neighbor Table Entry
    Neighbor station ID
    Current cost to neighbor ($C_N$).
    An entry for each gradient currently being maintained.

Neighbor Gradient Entry
    Destination station ID.
    Neighbor's current cost to destination ($C_{ND}$).

Gradient Table
    An entry for each gradient currently being maintained. One entry per destination.

Gradient Table Entry
    Destination station ID
    Current best cost to destination ($C_D$)
    Current best cost neighbor station ID
    Frozen status (on or off)
    Frozen time out
    Frozen cost ($C_{DF}$)
    Frozen neighbor ID ($N_F$)
    Gradient time-out
    Source station List, containing an entry for each source station having the same destination.

Source Station Entry
    Source station ID
    Hop count
    Maintain status (yes or no)

Fast Probe Data Format
    Transmitting station ID
    Noise floor at station
    Transmit power
    A number of gradient entries—typically one for each destination entry in the Gradient table for which the transmitting station is maintaining a gradient and which has a neighbor PDG that does not exceed maxCost.

Fast Probe Gradient Entry
    Destination station ID.
    Best cost to destination (PDG) from the transmitting station.
    List of Source stations.

Source Station Entry
   Source station ID
   Maintain status (yes or no)
   Hop count Fast probing starts/continues when the Gradient table contains one or more entries. Fast probe messages are generated at FPrate until the fast probing stops. Fast probing stops when no entries remain in the Gradient table.

If a new neighbor is added by the Slow Probing process, entries for each destination in the Gradient table would be added to the Neighbor table. If all neighbors are deleted, the Gradient table would also be deleted and the station would leave fast probing mode.

When a source station (the current station) originates a data message to a given destination or receives a data message from a neighbor that is destined elsewhere, three possibilities occur:
1. The Gradient table contains an entry for the destination of the message and the best cost to destination does not exceed maxCost. In this case the message can be transmitted via the specified neighbor.
2. The Gradient table does not contain an entry for the message destination. In this case, a new Gradient table entry is created (with status of "yes" maintained) and the message must be queued for future transmission.

In each case above, the hop count in the Gradient table is set to maxHops. When an originating station is completely finished sending data to the destination, it marks its corresponding Gradient table entry by setting maintain status to "no". This flag will then be disseminated by a future fast probe.

If the Gradient table does not already contain an entry corresponding to the message destination then an entry is added for that source/destination. An entry is added to each of the Neighbor tables for the new destination. If the Gradient table does contain an entry for the message destination, but does not have a corresponding source station entry, that source station ID is added to the entry's source station ID list. If a table entry has not been updated for Gtimeout, then that entry is deleted. The corresponding entries in the Neighbor tables are deleted.

A fast probe message is formed by enumerating, for each known destination in the Gradient table, the best cost to destination ($C_D$=min($C_N$+$C_{ND}$) for all neighbors N) for that destination.

If a Gradient table entry is frozen and all values of $C_{ND}$>$C_{DF}$ (for all neighbors N) then the value of $C_D$ is sent from the Gradient table, otherwise the best cost to destination $C_D$ as calculated above is used, but only for the subset of neighbors such that $C_{ND}$<$C_{DF}$ If the Gradient table entry is not frozen and all of the gradients via neighbors have $C_N$+$C_{ND}$s that exceed maxCost then that destination entry is not included in the message. If the Gradient table entry is frozen, that destination entry is always included in the message. If the entry in the Gradient table for the given destination has all Source entry hop counts<1 then that destination entry is not included in the message. The Source entries in the fast probe message correspond to those in the Gradient table. The fast probe message is transmitted with enough power to reach all Close and Lonely neighbors. All Source station entries are deleted from the Gradient list if they have a maintain status of "no". If all source entries are deleted, the corresponding destination entry is deleted from the Gradient table.

When a fast probe message is received, the Transmitting station ID, noise floor and transmit power information in the message are used to update the cost to neighbor ($C_N$) for the transmitting neighbor station. If no such neighbor exists, a new Neighbor table entry is created. For each fast probe gradient entry, the neighbor gradient tables are updated with the new values of $C_{ND}$ regardless of their previous values.

For each fast probe gradient entry, the Gradient table is updated as follows:
   Change the gradient timeout to reflect the current time.
   Copy source station entries from the probe message table to corresponding entries in the Gradient table.
   Decrease hop counts by one.
   Add new entries if not already present.
   Update the Neighbor gradient entry.
   Update the Gradient table entry for the specified destination as follows (assuming the fast probe gradient entry is from neighbor N with best cost to destination of $C_{ND}$):

If Gradient Table Entry Not Frozen
   If $C_N$+$C_{ND}$ is greater than or equal to the current best cost to destination $C_D$ and that cost is not through neighbor N then nothing is done.
   If $C_N$+$C_{ND}$ is less than the current best cost to destination $C_D$ and that cost is not through neighbor N then update the current best cost $C_D$ to the decreased value $C_N$+$C_{ND}$.
   If $C_N$+$C_{ND}$ is less than the current best cost to destination $C_D$ and that cost is through N then update the current best cost $C_D$ to the decreased value $C_N$+$C_{ND}$.
   If $C_N$+$C_{ND}$ is greater than the current best cost to destination $C_D$ and that cost is through N then the gradient table entry is frozen: The Frozen status is set to "on" and the Frozen timeout is set to Ftime, and $C_{DF}$ is set to the current value of $C_D$. Set $C_D$ to the new higher value $C_N$+$C_{ND}$, and retain the neighbor station ID ($N_F$) via which the frozen cost $C_{DF}$ was attained.

If Gradient Table Entry is Frozen
   A. If N=$N_F$ OR.
   B. If N<>$N_F$ AND if $C_{ND}$ is less than the frozen cost $C_{DF}$
then:
   If $C_N$+$C_{ND}$ is greater than or equal to the current best cost to destination $C_D$ and that cost is not through neighbor N then nothing is done.
   If $C_N$+$C_{ND}$ is less than the current best cost to destination $C_D$ and that cost is not through neighbor N then update the current best cost $C_D$ to the decreased value $C_N$+$C_{ND}$.
   If $C_N$+$C_{ND}$ is less than the current best cost to destination $C_D$ and that cost is through N then update the current best cost $C_D$ to the decreased value $C_N$+$C_{ND}$.
   If $C_N$+$C_{ND}$ is greater than the current best cost to destination $C_D$ and that cost is through N then the gradient table entry is refrozen: The Frozen status is left "on" and the Frozen timeout is reset to Ftime and $C_D$ is set to the new higher value $C_N$+$C_{ND}$. Note: $C_{DF}$ or station ID ($N_F$) via which the frozen cost $C_{DF}$ was attained should not be changed.

If the frozen timeout expires set the Frozen status to "off".

Figure 8:
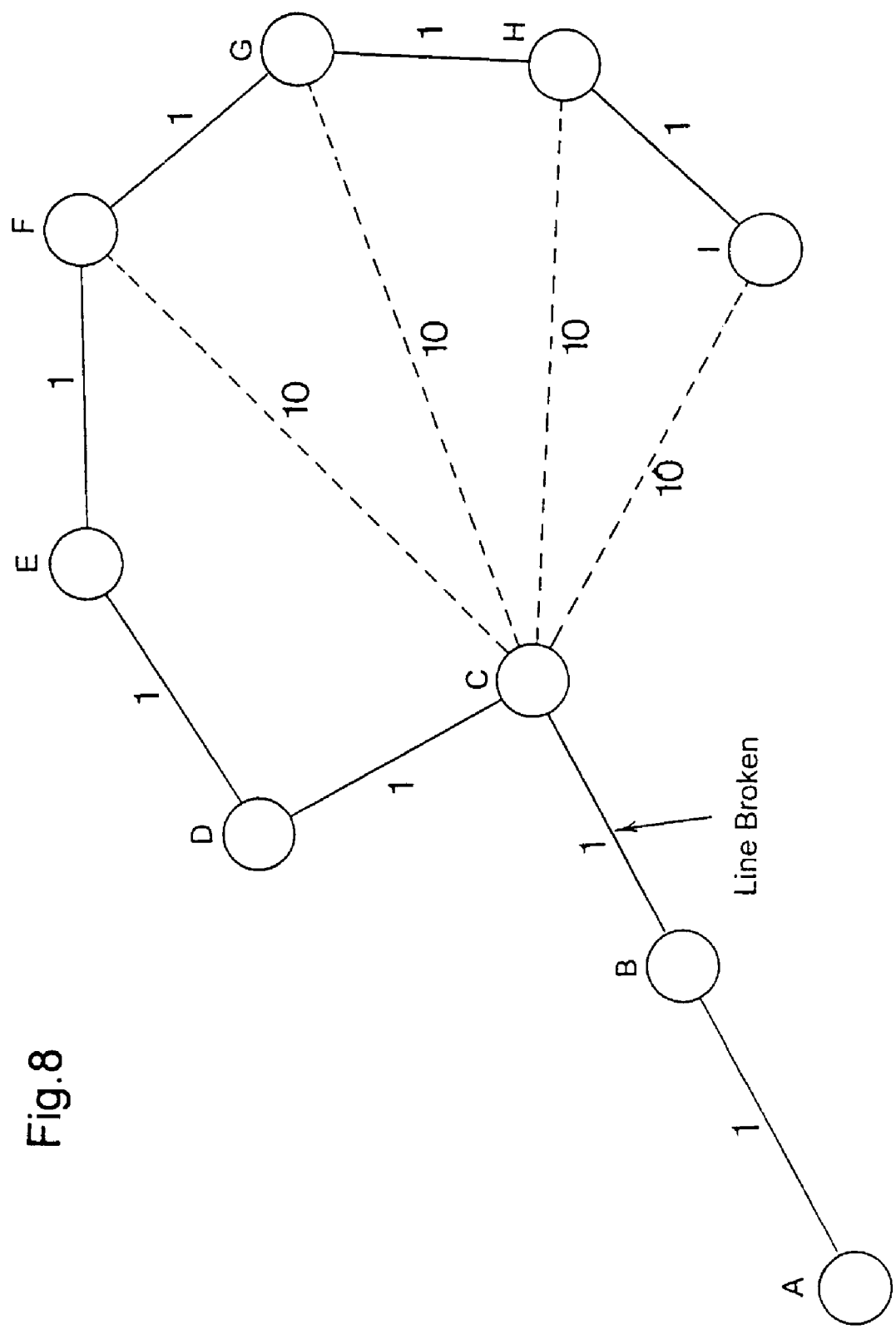
FIG. 8 is a simplified schematic diagram illustrating the formation of a loop in a network employing vector routing methods.

Referring now to FIG. 8, the problem of loops forming in a network, such as that used by the present invention, employing vector routing is discussed further. FIG. 8 shows a number of network stations A to I. Each station transmits probe signals at regular intervals, the probe signals containing data on the cost to destination via indicated stations, to its neighbors while a route is being maintained to a destination station. Assume that all of the other stations are developing gradients to a destination station A, that the cost to neighbor ($C_N$) is 1 in each case, and that the cost from stations F to I to station C directly is 10. After a time, station I will know that the total cost to station A, via stations H to B, is 8. If the cost between any of the stations, for example, between B and C, should increase, this will affect the costs all the way up the chain and each station should increase its cost to A, since all routes to A lead via the link between B and C.

If the cost from B to C goes up suddenly to a high number (say, infinity, due to B and C losing contact with one another) and C does not hear any probes or transmissions from B, then C changes its cost to A, via B, to infinity. Station C continues to listen to other stations' probe signals and hears, for example, probe signals from station I indicating that it has a cost to A of 8. Since the cost from C to I directly is 10, this results in C thinking that it can go via I to A at a total cost of 10 plus 8 or 18, which is better than infinity. However, this is of course not true, as if a transmission is routed via station I it ends up back at station C and a loop has been formed, so that the message never gets to station A.

In order to deal with this situation, a method is required that prevents a station from identifying another station as an intermediate station for transmission of a message to a destination station, when in fact the selected intermediate station cannot reach the destination station. Effectively, this is done by establishing a requirement for a predetermined period of time that an intermediate station cannot be replaced by stations having a cost to destination value higher than a "frozen" test value. The requirement is maintained for a period sufficient to allow all intermediate stations on the route to be updated with new cost data.

In the above example, the frozen test value for the cost from C to A would be 2. Unless station C heard a probe from another station with cost to destination of less than 2 during the freezing period, it would not replace station B with another station. During the freezing time, all of the stations D to I up the route will update their cost to infinity, with each station having its own frozen test value in the interim. For example, station B would have a cost to A of 3, and would not update if it did not hear a station with a cost to A of less than 3.

It is important that the freezing period should be long enough to allow for any station up the chain that station C can see directly (at any cost) to be updated. In the present example, station C can see stations F, G, H and I directly at a high cost of 10. Thus, the freezing period must allow sufficient time for the probing process to update stations F to I before allowing C to select one of them as an intermediate station in a route to station A.

In the present example, if the freezing period is set to, say, 10 probe intervals, then after 7 probe intervals, station I would be updated and will show a cost to station A of infinity. If at this point station C unfreezes its test value of 2, it will only receive probe signals from other stations indicating a cost to station A of infinity, and will not select any one of them, as this indicates that those other stations also have no route to station A. This prevents the formation of a loop.

The freezing process is illustrated in greater detail in the following three examples.

This section will illustrate two examples of the freezing and re-freezing process. The first describes a simple situation in which the best next neighbor stays unchanged. The second shows the best next neighbor changing while it is frozen.

EXAMPLE 1

Figure 9:
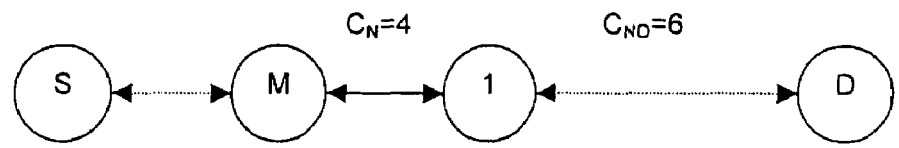
FIGS. 9 to 11 are schematic diagrams illustrating a method of the invention for avoiding the formation of routing loops.

This example is based on station (M) in FIG. 9. It shows the time out operation for each freezing operation.

A gradient is created from S to D. The Gradient Table (GT) of station M is as below:

| GT(M) | $C_D$ | N |
|---|---|---|
| D | 10 | (1) |

Assume the $C_{ND}$ changes from 6 to 7:

| GT(M) | $C_D$ | N | F | $C_{DF}$ | $N_F$ | Ftime |
|---|---|---|---|---|---|---|
| D | 11 | (1) | Yes | 10 | (1) | 100 |

Ftime is the time out count which means the frozen status will be cleared after 100 ms. If the $C_{ND}$ changes again before the first frozen entry times out, say from 7 to 9, this is referred to as re-frozen. The GT of station M will be as below. At this moment, we will use the re-frozen table which keeps track of the $C_{DF}$ $N_F$ and Ftime.

| GT(M) | $C_D$ | N | F | $C_{DF}$ | $N_F$ | Ftime |
|---|---|---|---|---|---|---|
| D | 13 | (1) | Yes | 10 | (1) | 40 |
|   |    |     |     | 11 | (1) | 100 |

The timer of the second entry (100 ms) will be started when it is created.

When the first entry times out, we will use the $C_{DF}$ and $N_F$ values in the second re-frozen entry. In our implementation, we will copy those entries forward.

| GT(M) | $C_D$ | N | F | $C_{DF}$ | $N_F$ | Ftime |
|---|---|---|---|---|---|---|
| D | 13 | (1) | Yes | 10 | (1) | 0 |
|   |    |     |     | 11 | (1) | 60 |

The re-freezing might happen several times.

EXAMPLE 2

Figure 10:
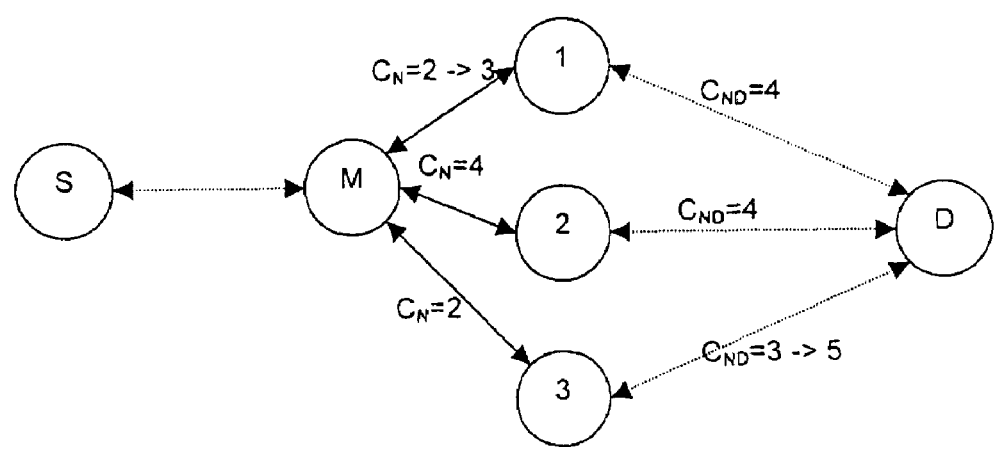

This example is based on station (M) in FIG. 10.

A gradient is created from S to D. After stabilizing, the GT of M is as below:

| GT(M) | $C_D$ | N |
|---|---|---|
| D | 5 | (3) |

Scenario 1

Assume $C_{ND}$ of (3) is changed from 3 to 5. A fast probe is received from (3). The GT in (M) will be updated as below.

| GT(M) | $C_D$ | N | F | $C_{DF}$ | $N_F$ | Ftime |
|---|---|---|---|---|---|---|
| D | 7 | (3) | Yes | 5 | (3) | 100 ms |

At this moment, the fast probe coming from (2) will not affect the GT of (M) because $C_N+C_{ND}=8$ which is larger than $C_D=7$.

The fast probe coming from (1) will update the GT of (M) because $C_N+C_{ND}=6$ which is smaller than $C_D=7$. After updating, the GT of (M) will be as below. Assume Ftime is 40 ms now.

| GT(M) | $C_D$ | N | F | $C_{DF}$ | $N_F$ | Ftime |
|---|---|---|---|---|---|---|
| D | 6 | (1) | Yes | 5 | (3) | 60 ms |

Scenario 2

Assume $C_N$ of (1) changes from 2 to 3. This will cause the GT entry to be re-frozen:

| GT(M) | $C_D$ | N | F | $C_{DF}$ | $N_F$ | Ftime |
|---|---|---|---|---|---|---|
| D | 3 + 4 = 7 | (1) | Yes | 5 | (3) | 50 ms |
|   | 6 | (1) |   |   |   | 100 ms |

When the first entry is timed out, the GT will be as below:

| GT(M) | $C_D$ | N | F | $C_{DF}$ | $N_F$ | Ftime |
|---|---|---|---|---|---|---|
| D | 7 | (1) | Yes | 5 | (3) | 0 |
|   | 6 | (1) |   |   |   | 50 ms |

When the second entry is timed out, the GT will be as below:

| GT(M) | $C_D$ | N | F | $C_{DF}$ | $N_F$ | Ftime |
|---|---|---|---|---|---|---|
| D | 7 | (1) | No | 6 | (1) | 0 |

EXAMPLE 3

Figure 11:
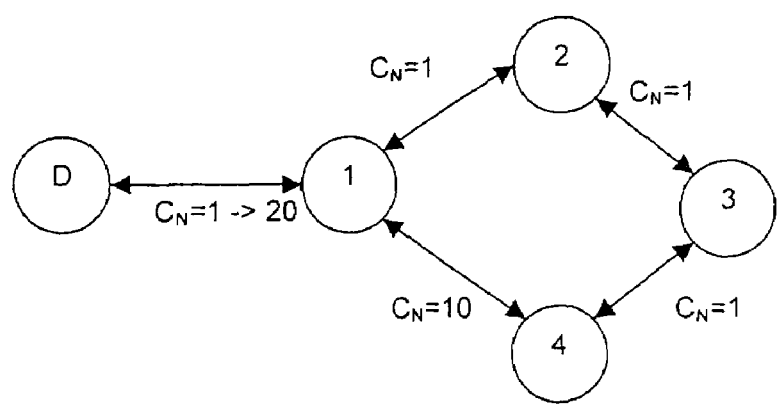

This example illustrates the total operation of several stations when freezing happens. In FIG. 11, the cost between (1) and (4) is 10 so the traffic to (D) will go through (3), (2) and (1).

Assume the cost between (D) and (1) grows, say, from 1 to 20. That will cause (1) to be frozen.

The following table shows all the gradient tables (destination to (D)).

Assume the fast probe happens every 10 ms. The table below shows absolute time in ms.

| Nbr Time (ms) | Station (1) | | | | (2) | | | | (3) | | | | (4) | | | |
|---|---|---|---|---|---|---|---|---|---|---|---|---|---|---|---|---|
| | $C_D$ | N | $C_{DF}$ | $N_F$ | $C_D$ | N | $C_{DF}$ | $N_F$ | $C_D$ | N | $C_{DF}$ | $N_F$ | $C_D$ | N | $C_{DF}$ | $N_F$ |
| 0 | 1 | (D) | | | 2 | (1) | | | 3 | (2) | | | 4 | (3) | | |
| 10 | 20 | (D) | 1 | (D) | | | | | | | | | | | | |
| 20 | *1 | | | | 21 | (1) | 2 | (1) | | | | | | | | |
| 30 | | | | | | | | | 22 | (2) | 3 | (2) | | | | |
| 40 | | | | | | | | | | | | | 23 | (3) | 4 | (3) |
| 50 | | | | | | | | | | | | | | | | |
| . | | | | | | | | | | | | | | | | |
| 100 | 20 | (D) | | | | | | | | | | | | | | |
| 110 | | | | | 21 | (1) | | | | | | | | | | |
| . | | | | | | | | | | | | | | | | |

ALGORITHM EXAMPLE

*1. Station (1) receives FP from (4). Execute the algorithm for frozen station. The $C_D$ in FP(4) is 4 which is higher than my frozen cost $C_{DF}=1$, so it won't change the GT of station 1.

We claim:
1. A communication network comprising a plurality of stations each able to transmit and receive data so that the network can transmit a message comprising a plurality of data packets from an originating station to a destination station via at least one opportunistically selected intermediate station, wherein each station is configured to:
   select, according to a predetermined criteria, a probing channel for the transmission of probe signals to other stations;
   transmit neighbor gathering probe signals of the selected probing channel to other stations which receive the transmitted neighbor gathering probe signals from a probing station responding directly or indirectly to indicate to the probing station availability of the other stations as the destination station or as neighbor stations;
   maintain a neighbor table comprising details of other available stations identified using the transmitted neighbor gathering probe signals;
   transmit, when needing to send data to the destination station, gradient gathering probe signals to, and to receive gradient gathering probe signals from, stations in the neighbor table to gather gradient data indicative of a cost of connectivity to said destination station ($C_{ND}$)

from the stations in the neighbor table and from the originating station needing to send data to the destination; and maintain, as needed, a gradient table comprising data related to a cost of communicating with each neighbor station from each station ($C_N$), with the destination station from each station, and with the destination station from each of the stations represented in each station's neighbor table;

allow each client station to select an intermediate station, from the stations in its neighbor table having lower costs of communicating to said destination station than each client station, for an opportunistic onward transmission of data from the originating station to the destination station when a minimum sum of all costs $\Sigma(C_N+C_{ND})_{min}$ of communicating to the destination station from the originating station does not exceed a maximum cost (maxCost) or does not exceed a current best cost to destination ($C_D$) or does not exceed a frozen cost ($C_{DF}$), wherein the $C_{DF}$ comprises the $C_D$ previously maintained in the gradient table; and prevent each station from opportunistically transmitting data from the originating station to the destination station when $\Sigma(C_N+C_{ND})_{min}>C_D$ and/or maxCost$>C_D$ and/or $C_{DF}>C_D$.

2. The communication network of claim 1 wherein each station is configured to establish a cost to destination test value for each gradient table entry for a predetermined period of time during which stations in the gradient table cannot be replaced by other stations with a higher cost to destination value.

3. The communication network of claim 2 wherein the predetermined period of time is a multiple of the interval between gradient gathering probe signals, calculated to be sufficient for all stations in the gradient table to update their cost to destination values.

4. The communication network of claim 1 wherein each station is further configured to include, in the details of other available stations identified by the neighbor gathering step, a path loss and power required to reach the other available stations.

5. The communication network of claim 4 wherein each station further includes a transmitter configured to transmit gradient gathering probe signals from each station only while the neighbor table of each station contains entries.

6. The communication network of claim 1 wherein each station includes a controller configured to calculate, for each station in the neighbor table, a cost to destination value for the cost of transmitting a message from a given originating station to a given destination station via each such station in the neighbor table.

7. The communication network of claim 1 wherein the network is configured to maintain a calculated cost to destination value for each station constant for a period during which other stations can update their own cost to destination values, to prevent stations using obsolete cost to destination values of other stations in their own calculations.

8. The communication network of claim 1 wherein each station includes a memory configured to maintain a temporary record of its own cost to destination value.

* * * * *